United States Patent [19]
Pendergrass

[11] Patent Number: 5,628,200
[45] Date of Patent: May 13, 1997

[54] HEAT PUMP SYSTEM WITH SELECTIVE SPACE COOLING

[75] Inventor: Joseph C. Pendergrass, Gainesville, Ga.

[73] Assignee: Wallace Heating & Air Conditioning, Inc., Gainesville, Ga.

[21] Appl. No.: 372,732

[22] Filed: Jan. 12, 1995

[51] Int. Cl.$^6$ .................... F25B 41/00; F25B 27/00
[52] U.S. Cl. ............................. 62/197; 62/238.6
[58] Field of Search ..................... 62/197, 238.6, 62/238.7, 160; 237/2.8

[56] References Cited

U.S. PATENT DOCUMENTS

| | | | |
|---|---|---|---|
| 3,017,162 | 1/1962 | Haines et al. | 62/238.6 |
| 4,019,338 | 4/1977 | Poteet | 62/238.6 |
| 4,232,529 | 11/1980 | Babbitt et al. | 62/160 |
| 4,438,881 | 3/1984 | Pendergrass | 237/2.8 |
| 4,955,207 | 9/1990 | Mink | 62/238.6 |
| 5,355,690 | 10/1994 | Iritani | 62/90 X |

*Primary Examiner*—William E. Wayner
*Attorney, Agent, or Firm*—King and Schickli

[57] ABSTRACT

A reversible heat pump provides multiple heating and cooling modes and includes a compressor, an evaporator and heat exchanger all interconnected and charged with refrigerant fluid. The heat exchanger includes tanks connected in series to the water supply and a condenser feed line with heat transfer sections connected in counterflow relationship. The heat pump has an accumulator and suction line for the refrigerant fluid upstream of the compressor. Sub-cool transfer tubes associated with the accumulator/suction line reclaim a portion of the heat from the heat exchanger. A reversing valve switches between heating/cooling modes. A first bypass is operative to direct the refrigerant fluid around the sub-cool transfer tubes in the space cooling only mode and during which an expansion valve is utilized upstream of the evaporator/indoor coil. A second bypass is provided around the expansion valve. A programmable microprocessor activates the first bypass in the cooling only mode and deactivates the second bypass, and vice-versa in the multiple heating modes for said heat exchanger. In the heating modes, the evaporator may include an auxiliary outdoor coil for direct supplemental heat dissipation into ambient air. In the multiple heating modes, the condensed refrigerant fluid is regulated by a flow control valve.

20 Claims, 3 Drawing Sheets

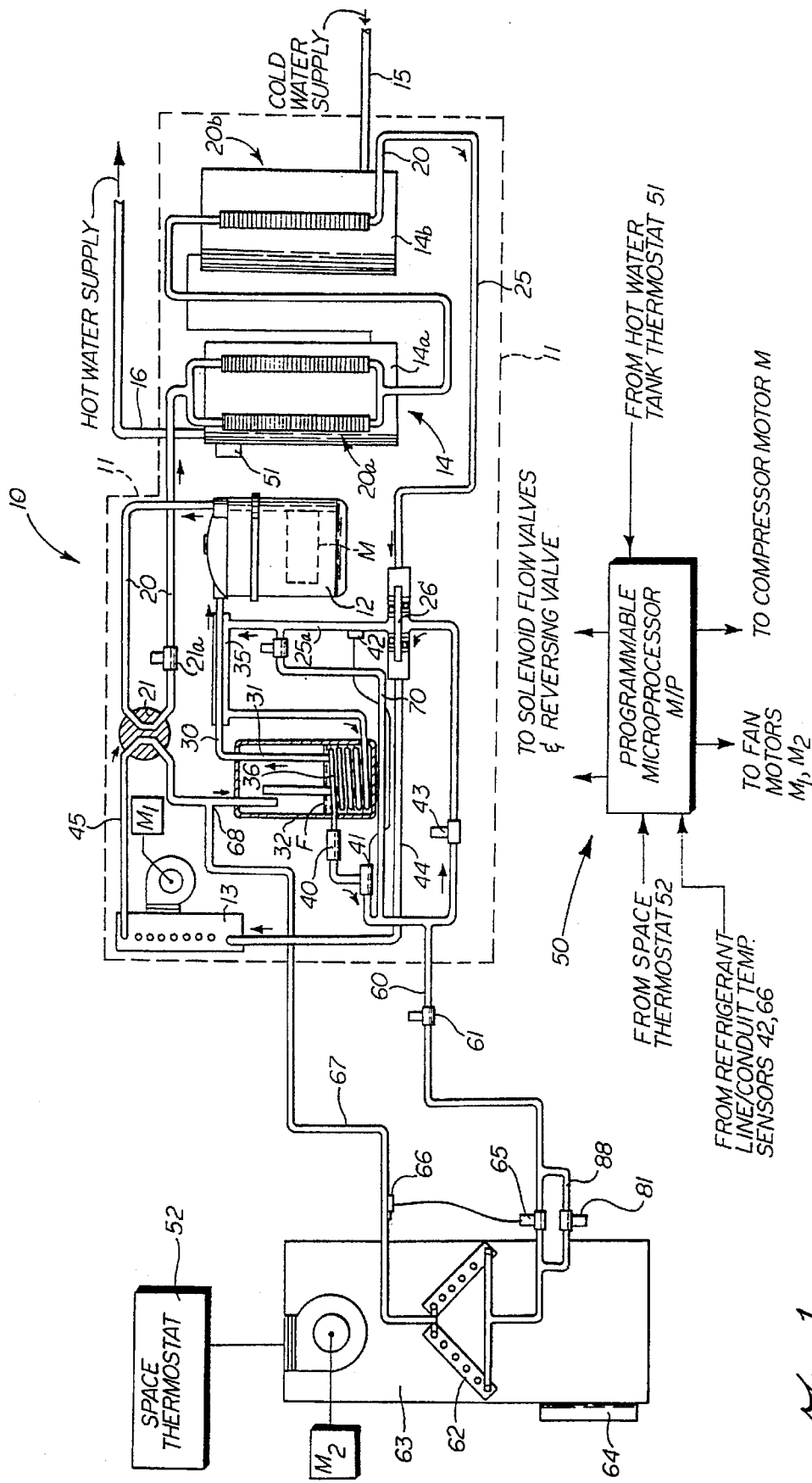

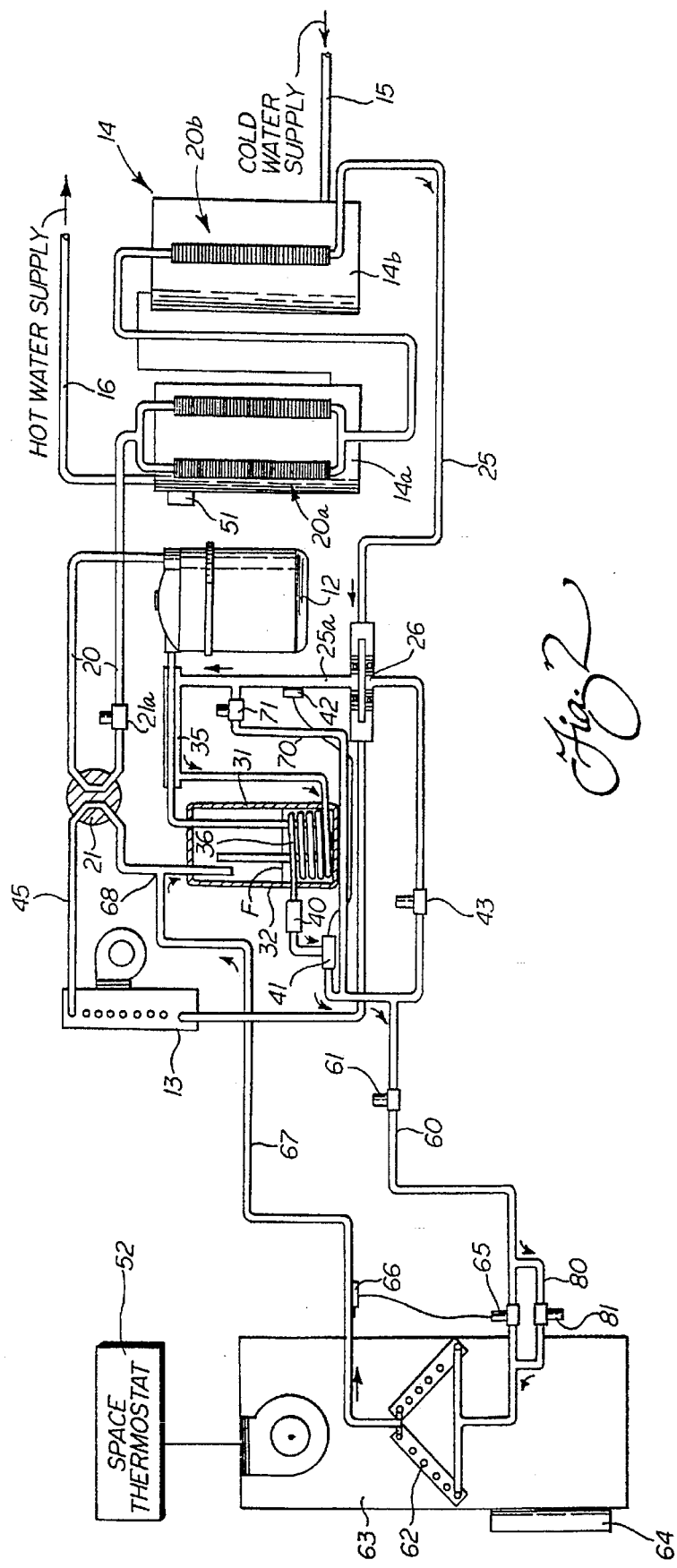

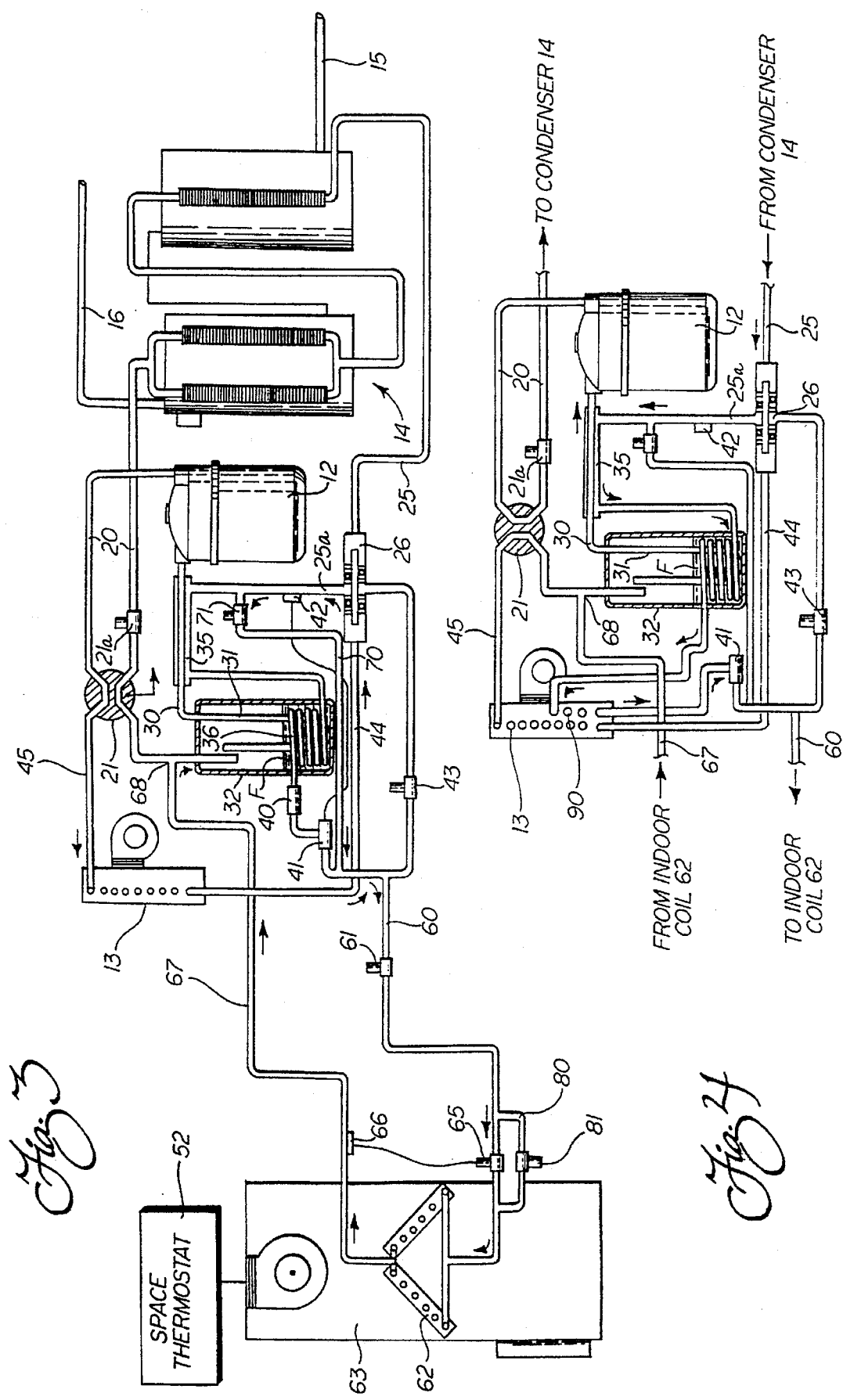

HEAT PUMP SYSTEM WITH SELECTIVE SPACE COOLING

BACKGROUND OF THE INVENTION

This invention was made with Government support under Grant DE-FG44-92R410601 awarded by the Department of Energy. The Government has certain rights in this invention.

The present invention relates to a reversible heat pump system including hot water heating capability, and more particularly, to a combined heat pump and air conditioning system utilizing bypasses so as to provide optimum operation in the multiple heating modes, as well as the cooling modes.

It is well known that conservation of available energy is becoming more and more important each day. This is caused by the ever decreasing supply of fossil and other non-renewable resource fuels, as well as the exploding population in the world. As fuels become scarcer, and the need for energy soars with the increasing population, it is readily apparent that more efficient operation of energy using systems is required.

Among the energy using systems that are required by people for comfortable living, the one most in demand involves heating and cooling of fluids. A primary need is represented by water heating and space cooling. Of course, in addition space heating is an ever present need in colder climates. For each of these needs, one of the most successful systems for converting energy into the heated or cooling working fluid needed to carry out the purpose is the heat pump system.

As a consequence, heat pump systems are becoming more and more widely used for combined heating/air conditioning. The growth of heat pump systems is not only in the home market, but also in the industrial applications. In its broadest sense, a heat pump system extracts heat energy stored in a heat reservoir, such as the earth's atmosphere, by circulating ambient air through evaporator coils charged with a refrigerant fluid, thereby effecting heating of the refrigerant fluid within the coils. For water heating, after the heat is extracted from the evaporator coils, usually in an outdoor unit, the heated refrigerant fluid is directed to an accumulator, where the warm saturated vapor established by the outdoor unit enters a suction line transferring the vapor to a compressor. The vapor is compressed into a high pressure, high temperature refrigerant gas, and then this super heated gas is passed into a heat exchanger to effect heat transfer to the working fluid, such as relatively low temperature water. The resultant hot water is used for domestic or industrial hot water, heating or other uses.

One of the most successful heat pump systems, which is adapted for hot water heating only is disclosed in my previous U.S. Pat. No. 4,438,881, issued Mar. 27, 1984. That prior effort resulted in substantial savings for hot water heating systems by regulating the flow of ambient air over the outdoor coil as the heat pump operates in the heating mode. Thus, while the previous system is successful, additional increases in efficiency are desirable, and furthermore adaptation of the heat pump system to a combined heating/air conditioning system is needed. While maintaining the focus on efficient water heating by utilizing a heat pump, and reclaiming the maximum heat from the refrigerant liquid returning from the hot water tanks, extension of the system to provide selective space cooling, also in a very efficient manner, has been discovered as being a very important next step in this field. While some effort has been extended by others in this direction in the past, insofar as I have been able to determine, none of these efforts have been successful.

One of the earliest efforts in this field is represented by the Haines et al. U.S. Pat. No. 3,017,162 owned by the General Electric Company. In this early effort, hot water and space cooling was produced through the operation of a refrigerator in a household kitchen. A portion of the heat passing through the evaporator of the refrigerator was transferred to the water in the hot water tank and a portion to the ambient air in an outside coil. In addition to providing food refrigeration and hot water heating, one additional mode of operation of the heat pump system provided the air conditioning to the kitchen space. While the basic concepts were thus available as early as the date of '162 prior art patent, this early system would not be capable of operating at a Coefficient of Performance (COP) suitable to today's standards.

Another attempt at combining heat pump and air conditioning functions, and particularly directed to heating of water in a swimming pool during the heating mode, is illustrated in the U.S. Pat. No. 4,019,338 to Poteet. Building off of the concepts in the prior art '162 Haines et al. patent, the Poteet system still leaves much to be desired in terms of efficiency. For example, there is no substantial reclaiming of the residual heat left in the refrigerant fluid as it returns from the swimming pool. Also, insofar as can be determined, the attempt to use the indoor coil with an expansion valve for evaporating the refrigerant fluid during the heating mode of operation would not be sufficiently efficient to be successful. In any case, the COP of the Poteet '338 patent system is again way below today's standards.

SUMMARY OF THE INVENTION

It is accordingly an object of the present invention to provide a high efficiency combined heat pump heating system and air conditioning system by overcoming the shortcomings of the prior art.

Another object of the invention is to provide a heat pump/air conditioning system having multiple heating and cooling modes and capable of operating at a higher Coefficient of Performance (COP) than heretofore attainable.

It is another object of the present invention to provide such a system incorporating a reversible heat pump including a compressor, evaporator and heat exchanger all interconnected and charged with a refrigerant fluid primarily to heat water, but also to provide selective space cooling at the same time.

It is still another object of the present invention to provide a combined heat pump/air conditioning system wherein maximum reclaiming of heat from the refrigerant returning from the heat exchanger serving as the condenser is obtained during the multiple heating modes, but reclaiming is not provided in the cooling modes where the residual heat is directly passed to the outdoor coil.

It is still another object of the present invention to provide a combined heat pump/air conditioning system of the type described wherein evaporation of the refrigerant is performed in a highly efficient manner through the indoor coil when space cooling is needed by flooding the coil with refrigerant fluid as a result of bypassing the expansion valve of the indoor coil.

A further object of the present invention is to provide heating and/or selective air conditioning upon demand utilizing a single system including one or more bypasses for the refrigerant fluid at critical location(s) and controlling the bypass or bypasses by a programmable control means.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a combined heat pump/air conditioning system having multiple heating and cooling modes of operation with higher efficiency and more reliable operation under substantially all conditions than heretofore possible is provided. The system includes a basic reversible heat pump including a compressor, an evaporator in the form of an indoor or outdoor coil depending on the particular mode of operation, and a heat exchanger that serves as a condenser and preferably heats a first working fluid, namely a water supply. As usual, these components are interconnected by standard tubing and valving components with the entire circuit being charged with refrigerant fluid, such as Freon or equivalent.

To make the heat pump operate most efficiently, an accumulator and a suction line for feeding refrigerant fluid to the compressor includes integral heat exchangers in the form of transfer tubes for sub-cooling the refrigerant fluid returning from the condenser. A reversing or 3-way valve is provided to switch the system between heating/cooling modes. A pressure reducing means, such as an expansion valve feeds the refrigerant fluid to the evaporator that comprises an indoor coil during the cooling only mode of operation. The cooled air passing over the coil thus forms a second working fluid.

According to two important features of the broadest aspect of the present invention, a first bypass is provided to direct refrigerant fluid around the transfer tubes associated with the accumulator and the suction line when the reversing valve is set for the cooling only mode; and a second bypass is provided to direct refrigerant fluid around the expansion valve in the heating modes.

A control means, preferably a programmable microprocessor, activates the first bypass means to prevent sub-cooling of the refrigerant during the cooling only mode for maximum efficiency. Further, the control means serves to deactivate the first bypass means to thus allow sub-cooling, and to simultaneously activate the second bypass means around the pressure reducing means in the evaporator unit to flood the indoor coil, to thus provide maximum heating efficiency, as well as maximum space cooling efficiency. In this manner, maximum efficiency of the two working fluids, for both heating water and for cooling air in a living space, is obtained.

Instead of reclaiming heat from the refrigerant fluid from the heat exchanger/condenser during the cooling only mode, this heat is sent through the outdoor evaporator coil for immediate dispersal into the ambient air. With respect to the heating mode, the second bypass allows the refrigerant fluid after being sub-cooled to go around the pressure reducing means, flood the indoor evaporator coil for maximum heat transfer without super heating any substantial portion of the refrigerant fluid prior to being returned to the suction side of the accumulator/compressor.

In the preferred embodiment, the heat exchanger/condenser for hot water heating includes a pair of tanks connected in series and in counterflow relation to the condenser feed line that is connected to the compression side of the compressor through the reversing valve. When used in the first operational mode, that is solely to satisfy the demand for hot water, the outdoor coil is utilized to evaporate the refrigerant fluid by contact with ambient air before being returned to the accumulator and the compressor.

In the second mode of operation, advantage is taken of the relatively warm living space air to serve as the evaporator for the refrigerant fluid. In this instance, the selection of this coil provides the extra benefit for space cooling of the air flowing over the indoor coil. As indicated above, the indoor coil is flooded with the refrigerant by directing the fluid through a bypass and around the pressure reducing valve, such as the standard expansion valve. In this second mode of operation, a flow control valve responsive to the temperature upstream of the transfer tubes for sub-cooling the refrigerant fluid, accurately controls the flow throughout the system. This valve is particularly calibrated and the system balanced for assuring an adequate supply of fluid to the compressor through the suction line in this and all other heating modes.

In a third mode of operation, the reversing valve is switched to space cooling only. As indicated above, in this mode of operation, the refrigerant fluid from the condenser advantageously bypasses the sub-cooling transfer tubes of the accumulator and the suction line, the pressure is reduced by flowing through the expansion valve, which in turn is controlled by the temperature of the delivery line on the downstream side of the coil. In this mode, the expansion valve is pre-calibrated and the system balanced for top efficiency cooling effect, both bypasses are deactivated, and thus the system operates as a conventional high-efficiency air conditioning unit.

According to the invention, in certain instances, especially in retrofitting existing systems, it may be desirable not to take advantage of both bypass features in a heating and/or air conditioning system. If the heat pump unit is a dedicated heating system, the bypass around the sub-cool transfer means of the suction line and accumulator is not beneficial. However, if the system is used in any air conditioning or cooling mode, according to the present invention, the bypass feature is to be incorporated. Similarly, the feature for sub-cooling the refrigerant from the condenser may not be economically feasible since a substantial up front expense is required to add the transfer tubes around the suction line and/or within the accumulator. In this instance, exceptional results can still be obtained with a high COP in the combined heating (with sub-cooling)/cooling modes of operation by utilizing the bypass feature around the expansion valve at the indoor coil for the space cooling feature. This allows the liquid refrigerant to flood the indoor coil for maximum heat transfer, but without super heating any substantial portion of the fluid in the indoor coil. This single bypass feature, with sub-cooling, assures that the maximum amount of refrigerant fluid can be delivered to the suction line of the accumulator where a minimal amount of superheating does occur. As a result, the refrigerant fluid does not tend to back up in the system and the discharge pressure from the compressor is substantially increased for better heat pump operating efficiency. Also of paramount importance the compressor temperature is maintained at a steady design level (no overheating), and as a corollary advantage the compressor is not starved of lubricant.

Furthermore, in the instances where heat reclaiming is taken advantage of, as described earlier, the flow rate continues to be balanced. The flow control valve in effect takes the place of the expansion valve, always maintaining pressures and temperatures at the optimum levels.

Preferably, as mentioned briefly above, the heat exchanger/condenser to provide the hot water includes a pair of tanks connected in series and in a counterflow relationship to the water supply. The condenser feed line enters the first tank adjacent the location where the hot water is removed. Substantial heat transfer takes place in the first tank where twin finned tubes forms the first heat transfer section. In the second tank, the heat transfer section may comprise a single finned tube since the heat transfer in the second tank is more efficient. The refrigerant in the single finned tube in this heat transfer section allows more direct refrigerant liquid contact on the inside of the tube without interference from refrigerant gas bubbles, thus providing better transfer.

The control means preferably includes a programmable microprocessor that receives input signals including from the hot water tank thermostat and the space (indoor) thermostat. The microprocessor controls the solenoid valves in the fluid circuit, the reversing valve of the heat pump, as well as the fans for the indoor and outdoor coils and the compressor motor.

As an additional feature, an auxiliary sub-cooling coil can be provided adjacent the outdoor coil when the system is designed for water heated above the normal 150° F. level. In this instance, after the liquid refrigerant returning from the condenser/heat exchanger passes through the suction line and accumulator sub-cooling transfer tubes, the refrigerant fluid is directed through the auxiliary coil where additional heat is given up prior to passing through the main outdoor space coil (or the indoor coil when in the combined heating/space cooling mode) for evaporation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serves to explain the principles of the invention. In the drawings:

FIG. 1 is a schematic diagram of the combined heat pump/air conditioning system of the present invention illustrating the various components and illustrating operation in a first heating mode, namely, for water heating only;

FIG. 2 is a schematic view of the system and especially illustrating the operation in a second mode for space cooling coupled with hot water heating;

FIG. 3 illustrates the same schematic diagram of the system operating in a third mode for space cooling only; and FIG. 4 is a partial schematic view illustrating the use of an auxiliary sub-cooling coil adjacent the outdoor coil to allow higher hot water output.

Reference will now be made in detail to the present preferred embodiment of the invention, an example of which is illustrated in the accompanying drawings.

DETAILED DESCRIPTION OF THE INVENTION

With reference now first to FIG. 1, the present invention can be described in more detail utilizing this schematic diagram of a combined heat pump/air conditioning system, generally designated by the reference numeral 10. It will be understood as the description progresses with regard to the other schematic diagrams just how the particular circuit and components work together to provide the desired higher efficiency and more reliable operation in the multiple heating and cooling modes.

Specifically, the system 10 includes a fluid flow circuit made up of specific feed lines, return conduits, specific interconnections and junctions, valves (including solenoid operated flow valves) and a control means, all operating together in a novel fashion.

Whereas the current state of the art for combined heat pumps/AC systems provide a Coefficient of Performance (COP) of 2.5–3.0, with the system 10 of the present invention the operation consistently provides a COP of 4.0–4.5. While the principles of the present invention can be applied for any combination of heating and cooling fluids at maximum efficiency and reliability, the representative application described for the purpose of setting forth the invention concentrates on three basic modes of operation: (1) water heating only/FIG. 1; (2) combined space cooling with water heating/FIG. 2; and (3) cooling only/FIG. 3. In addition, an alternative arrangement for maximum efficiency water heating to a higher temperature is represented in FIG. 4.

Accordingly, a reversible heat pump means, designated by the dashed line outline 11 includes a compressor 12, one or more evaporator means, such as an outdoor coil 13, and a representative heat exchange means, generally designated by the reference numeral 14. In the preferred embodiment disclosed, the heat exchanger 14 takes the form of a condenser fed by a cold water supply line 15 and providing as an output hot water through a hot water supply conduit 16. Typically, the temperature of the incoming water is 55° F.–60° F. and the output is 125° F.–135° F.

Thus, simply considering the combined heat pump/AC system 10 to provide a representative preferred embodiment of the invention, it can be considered as primarily a system to provide domestic or industrial hot water, but as will be seen in further detail the system 10 is also highly efficient in providing selective space cooling, as well as space heating. When in the heating modes, the system 10 provides for advantageous heat reclaiming from the heat exchanger/condenser 14, but when used for cooling only, a unique first bypass feature is implemented to simply pass the condensed refrigerant directly from the outdoor coil 13 to the expansion valve of the indoor coil. On the other hand, as will also be seen in more detail below, a second bypass arrangement is provided to increase the efficiency and reliability of the combined operation during heating and space cooling.

Utilizing FIG. 1 to describe additional components of the heat pump means 11, the hot gas from the compressor 12 is delivered to condenser feed line 20 where after passing through reversing valve 21 and normally open solenoid operated flow valve 21a, it enters the heat exchanger/condenser 14. As indicated above, this preferred embodiment is operating with the assumption that a primary objective is to provide a highly efficient hot water supply through the hot water delivery conduit 16.

In this hot water heating mode, the condenser 14 preferably includes a pair of tanks 14a, 14b. Within these tanks, the condenser feed line 20 includes a first heat transfer section 20a and a second heat transfer section 20b, respectively. As illustrated, the feed line 20 and the transfer sections 20a, 20b are in counterflow relation to the water flow through the tanks 14a, 14b. Note, for example that the cold water supply line 15 is positioned adjacent the exit of the condenser line 20. Upon leaving the condenser 14, the high pressure refrigerant liquid, now condensed, passes through a condenser return conduit 25 that includes a conventional check valve 26 as illustrated in the teaching of my previous U.S. Patent '881, identified above, and extension conduit 25a.

As will be apparent, the compressor 12 includes a suction line 30 that is fed from a U-shaped inlet tube 31 within an accumulator 32. The high pressure liquid return extension conduit 25a converts to an integral heat exchanger in the form of a closed transfer tube 35 for sub-cooling the refrigerant liquid prior to entering another integral heat exchanger in the bottom of the accumulator 32 through a second transfer tube 36. As illustrated, the transfer tube 36 is submersed in refrigerant liquid F and surrounds the bottom of the U-shaped inlet tube 31.

After passing through the sub-cooling transfer tubes 35, 36, the liquid, which is now cooled to a temperature of about one half or more than the exiting temperature from the condenser 14, is passed through a filter 40, and then into a flow control valve 41. As will be explained more in detail below, the control valve 41 is operated in response to a refrigerant temperature sensor 42 positioned on the return extension conduit 25a.

In the hot water heating mode of FIG. 1, from the flow control valve 41 the controlled refrigerant liquid passes through a normally open solenoid operated flow valve 43 and then through the check valve 26 to outdoor coil feed line 44. In the outdoor coil 13, the refrigerant fluid picks up heat from the ambient air passing over the coil. It then passes through the outdoor coil return conduit 45, through the reversing valve 21, and into the open space above the refrigerant liquid F in the bottom of the accumulator 32.

Thus, with the system 10 thus described, the operation of the heat pump means 11 for the purpose of heating water within the heat exchanger/condenser 14 can now be fully understood. The super heated refrigerant gas is discharged from the compressor 12 through the condenser feed line 20 and the reversing valve 21 in order to heat the water to approximately 125° F.–135° F. exiting through the delivery conduit 16. Within the condenser 14, the temperature of the high pressure refrigerant liquid is reduced to approximately 100° F. in the conduit 25 where it then flows through the extension conduit 25a. The relatively cold gas/vapor at approximately 45° F. entering the compressor 12 from the U-shaped inlet tube 31 sub-cools the refrigerant liquid as it passes through the transfer tube 35 to about 85° F. Then the refrigerant liquid is sub-cooled further within the accumulator 32 by passing through the coiled transfer tube 36 to about 45° F. Passing through the flow control valve 41, the refrigerant liquid is reduced further to about 35° F., and since the flow valve 43 is open in this mode of operation, the refrigerant fluid is then passed through the check valve 26 to the outdoor coil 13. Assuming an approximately 20° F. ambient temperature, and thus with an approximate 10° F. temperature of the refrigerant fluid in the coil an approximate 15° F. temperature refrigerant fluid passes back through the reversing valve 21 and into the accumulator 32. The mixture of cold saturated vapor and liquid in the bottom of the accumulator 32 is heated by the warmer liquid refrigerant in the coiled transfer tube 36. The refrigerant has now changed to a state of much less saturation without any great increase in temperature or pressure. As this vapor passes through the U-shaped tube 31 it picks up a mixture of oil and a small amount of liquid refrigerant through a small hole located in the bottom of the U-shaped tube. This provides lubrication to the compressor 12 and insures that enough vapor is returned to cool the compressor motor. As this mixture of vapor oil pass through the suction line heat exchanger 35 any remaining liquid refrigerant is evaporated, thus eliminating the possibility of liquid refrigerant being returned to the compressor 12.

In order to provide the most efficient control means for the entire heat pump/air conditioning system 10, as described so far for the water heating mode, as well as will be described with regard to the other operating modes below, a programmable microprocessor, or other suitable electronic controller is provided, as generally designated by the reference numeral 50 in FIG. 1. The microprocessor 50 receives a temperature reading from an upper location of the tank 14 from a tank thermostat 51. Depending on the temperature that either calls for providing additional hot water heating or no hot water heating, a signal is sent through the microprocessor 50 to motor M of the compressor 12. As a result, the operation of the heat pump means 11 is thus either initiated or terminated. At the same time, in the water heating mode described, motor $M_1$ for the fan in the outdoor evaporating unit for delivering ambient air across the outdoor coil 13 is either turned off or turned on. Furthermore, the motor $M_1$ preferably operates in a variable speed mode, in accordance with the teaching in my previous U.S. Patent '881, identified above, for maximum operating efficiency.

In order to provide appropriate operation of the flow control valve 41, as indicated previously, the temperature sensor 42 usually senses a liquid refrigerant temperature in the 100° F. range. This sensor 42, in combination with the accompanying flow control valve is pre-set to maintain 10 to 15 degrees of sub-cooling of the refrigerant fluid being returned from the condenser 14. Therefore the flow control valve is appropriately adjusted in response to this temperature differential. In this manner, the system and its components, that have been properly calibrated and balanced for heat pump operation, operates very efficiently for its intended purpose of heating hot water.

The microprocessor 50 also of course serves to control the other various components of the heat pump means 11, such as the solenoid valves 21a, 43 (normally open in this mode) and the reversing valve 21, as shown and described. In addition, and as will be described further below for other operational modes, an expansion valve operates in one mode of operation to control the flow of refrigerant fluid through the system 10 in lieu of the flow control valve 41, and the microprocessor 50 controls the other open/close solenoid flow valves (as will be described). Also, a space thermostat 52 provides an input signal to the microprocessor 50, also as will be described below.

Thus, in the first mode of operation of the heat pump air conditioning system 10 of the present invention, the heat pump means 11 efficiently produces an output of hot water through the conduit 16. The heat from the high pressure liquid flowing through the conduit 25 and the extension conduit 25a is advantageously reclaimed or recaptured within the integral heat exchangers of the suction line 30 and the accumulator 32 through the transfer tubes 35, 36, respectively. The flow within the system is accurately regulated in response to the temperature sensor 42 monitoring the hot refrigerant liquid along the extension conduit 25a. With the refrigerant liquid having been reduced in temperature by approximately 65° F. before entering the outdoor coil 13, it expands into a gas, picking up ambient heat, whereupon it is transferred to the accumulator 32; the refrigerant liquid F in the bottom being boiled off, and then passes through the inlet tube 31, through the suction line 30 and to the compressor 12 for compressing and repeat of the cycle.

With reference now to FIG. 2 of the drawings, an additional important feature that allows the heat pump means 11 to also serve as an air conditioning unit for space cooling is illustrated. Connected to the feed line 44 upstream of the solenoid valve 43, there is provided a branch feed line 60 for diverting the cooled refrigerant liquid through a second open/close solenoid flow valve 61 and thence through an indoor coil 62 positioned within a conventional indoor air handler 63. As is conventional, the air handler 63 includes an inlet 64, and a blower including motor $M_2$, that discharges the air cooled by the indoor coil 62 into the space where the space thermostat 52 is located.

Just upstream of the indoor coil 62 is a conventional expansion valve 65 which is temperature differential controlled through a temperature sensor 66 mounted on return conduit 67 of the indoor coil 62. This indoor coil return conduit 67 taps into the return conduit 45 from the outside coil 13 at junction 68.

According to the invention, in addition to the system 10 and its various components described so far, I have discovered that providing two bypasses at strategic locations allows for: (1) operation of the system 10 in a more efficient air conditioning only mode, which will presently be described with respect to FIG. 3; and (2) operation in the combined heating/cooling mode to give not only maximum hot water heating efficiency (or space heating), but also at the same time, highly efficient space cooling.

Accordingly, a first bypass line 70 is employed between the high pressure return extension conduit 25a with a first bypass flow valve 71 serving to open/close said bypass line 70. This bypass function is operative to receive the refrigerant gas/vapor from the extension conduit 25a and the outdoor coil 13 when the valve 71 is open, and to deliver it downstream of the flow control valve 41 directly into the feed line 44. Then assuming the solenoid flow valve 43 is closed, refrigerant fluid goes through the open flow valve 61. In effect, the bypass line 70 delivers the refrigerant fluid around the sub-cool transfer means, namely the transfer tubes 35, 36 and the flow control valve 41. As will be seen in more detail when reviewing the third operation mode illustrated in FIG. 3, this bypass arrangement allows for high efficiency air conditioning operation of the system 10 in conjunction with the flow through the expansion valve 65 operating in response to the temperature sensor 66.

The second, and also a very important bypass means of the present invention, takes the form of a second bypass line 80 extending around the expansion valve 65 and including along its length an open/close solenoid flow valve 81. In essence, by bypassing the expansion valve 65 in each of the heating modes of the heat pump/air conditioning system of the present invention, the indoor coil 62 can now be flooded to thus allow substantially the entire finned, heat transfer surface to be used for evaporation of the refrigerant fluid. This allows maximum efficiency in terms of the transformation from a relatively cold refrigerant liquid into a gas/vapor form. In this mode of operation since the bypass line 70 is closed due to the deactivation of the solenoid bypass flow valve 71 by action of the microprocessor 50, the flow control valve 41 is exclusively providing the flow regulation and fluid balancing throughout the entire system. There is no need for addition control from the expansion valve 65, and indeed as will be discussed, the elimination of the expansion valve 65 from the flow path greatly enhances the efficiency of operation of the system 10 in the combined heating/cooling mode. With the expansion valve 65 out of the path, there is little or no superheating of the refrigerant fluid passing through the indoor coil 62. The desired warmed temperature through the return conduit 67, and the junction 68, and thus the approximately 45° F. gas/vapor temperature within the suction line 30 for the compressor 12 is provided in an advantageous manner. There is thus no tendency for overheating of the compressor due to the super heating requirement when using an expansion valve in this mode, which has been a problem in the past. Instead, utilizing the teaching of the present invention, maximizing of the output of the compressor 12 is realized.

Of course, as the space is cooled by the flow of air across the indoor coil 62, the space thermostat 52 responds once the set minimum temperature is reached. Through the operation of the microprocessor 50, the solenoid flow valve 61 is closed. The cooling of the space is then terminated. As the temperature increases so that additional space cooling is needed, the solenoid valve 61 reopens to repeat the cooling cycle.

When the solenoid valve 61 is closed, as described, but the thermostat 51 on the hot water tank 14a still calls for hot water heating, the solenoid valve 43 opens, converting the system 10 back to the mode 1 operation of FIG. 1. Of course, in the FIG. 2 mode when the space cooling requirements, as determined by the space thermostat 52, and the hot water heating requirements, as determined by the hot water tank thermostat 51, are both fulfilled, the microprocessor 50 operates to interrupt the power to the compressor motor M, the blower motor $M_2$ and/or the fan motor $M_1$, to terminate operation of the system.

As will be realized especially with respect to the combined operation for hot water heating/air conditioning, the system 10 of the present invention not only operates in a highly efficient manner but takes particular advantage of the warm living space air for evaporation of the refrigerant, which at the same time provides for space cooling; i.e. the best of both worlds in terms of conservation of energy is realized. In the combined heating/cooling modes of FIG. 2, the flow control valve 41 operates exclusively in response to the hot refrigerant liquid temperature coming from the condenser 14, which from extensive testing provides for highly accurate and dependable regulation of the flow of refrigerant through the system. This combined heating/cooling mode of operation, that thus completely excludes the expansion valve 65 from the circuit, extracts the maximum heat from the indoor coil. In other words, full use of the indoor coil 62 is obtained since the entry is unrestricted by the expansion valve. In providing the optimum operation, no longer is it necessary to use the standard 10%–15% of the indoor coil 62 for super heating of the refrigerant fluid. Indeed, I have determined that in this mode of operation, there is no concern with regard to liquid flood back, and of course expansion valve hunting is eliminated, and therefore super heating in the coil is unnecessary. Indeed, it is disadvantageous to the heat transfer phenomena in this mode since the desired 45° F. entry temperature to the suction side of the compressor 12 is harder, if not impossible without other adjustments to attain. For absorbing heat, I have discovered that it is best to simply evaporate the flooded liquid within the coil 62 and then pass that warmed (not super heated) gas/vapor directly back to the accumulator 32.

Furthermore, with the reclaim of the heat through the transfer tubes 35, 36 maximum water heating efficiency is clearly obtained. In my system, I am able to deliver the desired lower refrigerant temperature and pressure to the indoor coil 62. In the prior art designs where an expansion valve is utilized, for example in the Poteet prior art patent '338, if the same heating capacity is to be attained for the hot water heating operation, I have discovered that the expansion valve opens only a minimum amount (or even closes), thus resulting in starving of the indoor coil, overheating the compressor and eventually resulting in shut down of the system. Although it is not fully understood, it is believed that the lower temperature/pressure that is provided to the expansion valve causes the deleterious result. This has now been solved by including the bypass flow line 80 around the expansion valve 65 of the combined heat pump/air conditioning system 10 of the present invention. By boiling off the maximum liquid refrigerant in the indoor coil 62 there is no tendency for refrigerant to back up in the system, and thus the desired temperature of 45° F. for the suction side of the compressor is maintained.

In the tests that have been conducted with respect to this second mode of operation, it has also been found under substantially all conditions that the ideal suction gas pressure (gauge) of 75 pounds per square inch (psi) can be maintained. This means that under all conditions sufficient refrigerant gas/vapor supply is delivered to the compressor 12 which is a very important factor in maintaining maximum heat output within the feed line 20 and the heat exchanger/condenser 14. On the other hand, maintaining of these temperature/pressure parameters also insures against the overheating of the compressor 12 thus maintaining the windings of the motor M at the cool, designed temperature. As a result, burn out of compressors in the combined system 10 of the present invention is virtually eliminated.

With respect to the third mode of operation, illustrated in FIG. 3 as referenced above, it is assumed that the supply of hot water provided through outlet conduit 16 is satisfied so that the thermostat 51 sends a signal to the microprocessor 50 to terminate the supply of hot gas to the condenser 14; whereas, the space thermostat 52 is still calling for indoor cooling. According to the present invention, and as mentioned briefly above, the micro processor 50 now provides a signal to the first bypass flow valve 71 to be activated, that is opened.

As also illustrated in FIG. 3, the hot gas from the compressor 12 first travels through the first portion of the feed line 20, and is then diverted by the reversing valve 21 directly to the outdoor coil 13, which then becomes the condenser or heat exchange means of the system. The condensed liquid passes through the feed line 44, back through the check valve 26 and into return extension 25a. Since the first bypass flow valve 71 is open, and the flow control valve 41 is closed due to the low temperature at the sensor 42, the refrigerant liquid is forced to flow through the first bypass flow line 70. Solenoid valve 43 is closed thus directing the liquid directly into the indoor coil feed line 60 and through the open solenoid flow valve 61.

Further, according to the invention, the bypass flow valve 81 is now closed, causing the condensed refrigerant liquid to operate in a normal manner through the expansion valve 65 and then into the indoor coil 62. With the coil 62 operating to provide a percentage of the refrigerant fluid in a super heated condition, the temperature sensor 66 operates in a proper manner (with 10% super heated gas) to maintain the proper operation of the expansion valve 65. In this cooling only mode, there is the desired cooling effect due to the expansion of the refrigerant liquid for the space cooling function. Further, there is no deleterious back up of refrigerant fluid and there is efficient delivery of gas/vapor through the return conduit 67. From the junction 68, flow into feed line 20 is now blocked by the closed flow valve 21a. Accordingly, all of the gas/vapor enters into the accumulator 32. In this mode, flow is thus solely regulated by the original calibration of the system/components, including the expansion valve 65, and the original balanced design.

To put it another way, with the refrigerant liquid passing around the integral heat exchangers in the accumulator 32 and the suction line 30, the proper fluid flow at the design temperature/pressure (not sub-cooled) can then enter the indoor coil 62, and eventually back into the compressor 12. Since the entire system for air conditioning only is accurately calibrated and balanced through the expansion valve 65, highly efficient cooling is realized.

In certain retrofit situations, the concepts of the present invention can be utilized by employing only either the first or second bypass flow lines 70, 80 and corresponding bypass flow valves 71, 81. In either instance, the system upon which this modification is made, is accurately calibrated and balanced in so far as practical, but to provide increased efficiency of the heating of water and/or space cooling.

Another modification of the heat pump system 11 of the present invention can be carried out by the introduction of an auxiliary sub-cool coil 90 in the outdoor unit adjacent to outdoor coil 13, as illustrated in FIG. 4. This modification is utilized to further sub-cool the hot refrigerant liquid after it passes through the integral heat exchangers of the suction line 30 and the accumulator 32, and before entering the flow control valve 41. This auxiliary coil 90 is useful to assure that the optimum temperature liquid is supplied to the flow control valve 41 during the heating modes of the system 10. This is added as an auxiliary feature to any system where the hot water requirements are higher than normal, such as up to 150° F. hot water output. Otherwise, the system shown as modified in FIG. 4 operates the same as described with respect to FIGS. 1 and 2.

It will be readily apparent that the combined heat pump/air conditioning system 10 of the present invention can also be converted into a space heating mode by incorporating additional flow lines and solenoid open/close flow valves to in effect interpose the indoor coil 62 across the feed line 20 and the return conduit 25 for the heat exchanger/condenser 14 (modifications for such space heating, not shown).

To briefly reiterate a typical operating cycle for the system 10 of the present invention, and particularly with respect to the water heating mode of FIG. 1, the compressor 12 operates to provide super heated gas to the first heat transfer section 20a of the condenser 20, then through the second heat transfer section 20b whereupon the high pressure, condensed refrigerant liquid is present in the return conduit 25 and at approximately 100° F. Typically, the hot water supply temperature is in the 125° F. range. As the liquid refrigerant flows through check valve 26 and into the extension conduit 25a, the integral heat exchanger of the suction line 30 in the form of the concentric transfer tube 35 reduces the temperature to about 85° F. The integral heat exchanger of the accumulator 32 in the form of the transfer tube 36 sub-cools the refrigerant liquid another 40° F. which then results in an exiting 45° F. refrigerant liquid delivered to the flow control valve 41. Another 10° sub-cooling takes place in the flow control valve 41 to bring the temperature to 35° F. in the feed line 44 for the outdoor coil 13. Assuming an approximate 20° F. ambient temperature and an evaporating refrigerant temperature of about 10° F. in the coil, the relatively low pressure gas/vapor of 15° F. passes through the return conduit 45, past the junction 68 and into the accumulator 32. With gas/vapor being boiled from the refrigerant liquid F, at a rate to supply the compressor 12 with the optimum amount of refrigerant vapor and lubrication for maximum efficiency.

Similar operating parameters occur in the system of the present invention where the indoor coil 62 is utilized as the evaporator for the liquid refrigerant.

Preferably, the first heat transfer section 20a of the tank 14a includes twin finned tubes, as illustrated. With the super heated gas contacting the counterflow water supply, substantial heat is transferred in this tank up to the point of maximum heat being present at the top for supply through the outlet conduit 16 and adjacent the thermostat 51. In the second tank 14b only a single finned tube is included as the transfer section 20b. Because there is direct refrigerant liquid to liquid contact in the second tank, substantially less surface area, in the form of the single finned tube, is required. Also, in the second tank 14b, increased natural vertical circulation of the rising hot water occurs, thus providing a balanced hot water heating/condensing operation in the two tanks 14a, 14b.

In summary, it will be realized that the improved heat pump/air conditioning system 10 of the present invention provides results and advantageously not heretofore obtained in the prior art, particularly with respect to combining a hot water heating system by heat pump operation with a highly efficient space cooling system. To enhance the heating of the hot water, a sub-cool transfer means in the form of transfer tubes 35, 36 associated with the suction line 30 and accumulator 32, respectively, is provided. In this manner, the optimum 45° F. temperature gas/vapor at 76 psi is delivered to the compressor 12 for maximum heat output from the system 10. A first bypass means, in the form of bypass flow line 70 and bypass flow valve 71 allows the refrigerant fluid in the cooling only mode to flow around the transfer tubes 35, 36, as well as the sub-cooling flow control valve 41, and thus deliver the refrigerant fluid from the outdoor coil 13 directly to the indoor coil 62 utilizing the expansion valve 65. In the second mode of operation, illustrated in FIG. 2, there is an advantageous function of space cooling added by bypassing the expansion valve 65 by the bypass flow valve 80 and the solenoid operated bypass valve 81. In this mode, the indoor coil 62 is flooded with refrigerant liquid to greatly enhance the heat transfer capability and further improving the efficiency of operation. The programmable microprocessor 50 provides control of all of the components in the several operational modes described.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A combined heat pump/air conditioning system having multiple heating and cooling modes of operation comprising in combination:

a reversible heat pump means including a compressor, an evaporator means and heat exchange means interconnected and charged with refrigerant fluid to produce heating and/or cooling upon demand;

said heat exchange means effecting heat transfer between the refrigerant fluid and a first working fluid to condense said refrigerant fluid;

an accumulator and suction line for feeding refrigerant fluid to said compressor;

sub-cool transfer means for refrigerant fluid for reclaim of heat from said heat exchange means and provided by the refrigerant fluid in at least one of said accumulator and suction line prior to entry into said compressor;

reversing valve means for switching said system between said heating/cooling modes;

first bypass means for said refrigerant fluid from said heat exchange means with respect to at least a portion of said sub-cool transfer means when said reversing valve means is set for the cooling only mode of a second working fluid;

pressure reducing means for feeding said bypassed refrigerant fluid to said evaporator during said cooling only mode of said second working fluid;

second bypass means for directing said refrigerant fluid around said pressure reducing means; and control means for activating said first bypass means for bypassing said sub-cool transfer means and delivering refrigerant fluid to said pressure reducing means for said cooling only mode, and for deactivating said first bypass means and activating said second bypass means in the multiple heating modes for said heat exchange means, whereby maximum efficiency for said working fluids for both cooling and heating effect is obtained in the respective heating/cooling modes of operation.

2. The combined heat pump/air conditioning system of claim 1, wherein said heat exchange means of said heat pump means comprises tank means forming a condenser and feed line therefor, and said first working fluid is water for providing a hot water supply.

3. The combined heat pump/air conditioning system of claim 2, wherein said evaporator means of said heat pump means includes an outdoor coil and feed line therefor for evaporating said refrigerant fluid by contact with ambient air during a first heating mode of said first working fluid.

4. The combined heat pump/air conditioning system of claim 2, wherein said evaporator means of said heat pump means includes an indoor coil and feed line therefor for evaporating said refrigerant fluid for space cooling of air as the second working fluid during a combined heating/cooling mode for heating of said first working fluid/cooling of said second working fluid, and also for evaporating said refrigerant fluid during the cooling only mode.

5. The combined heat pump/air conditioning system of claim 4, wherein said heat exchange means of said heat pump means includes a condenser return line and a flow control valve, said condenser return line including said sub-cool transfer means;

said first bypass means including a first flow line around said sub-cool transfer means and a first flow valve for opening and closing said first flow line.

6. The combined heat pump/air conditioning system of claim 5, wherein said second bypass means includes a second flow line around said pressure reducing means and a second flow valve for opening and closing said second flow line.

7. The combined heat pump/air conditioning system of claim 6, wherein said flow control valve in said condenser return line is downstream of said sub-cool transfer means and bypassed by said first flow line; and temperature sensing means upstream of said sub-cool transfer means for control of said flow control valve.

8. The combined heat pump/air conditioning system of claim 1, wherein said pressure reducing means is an expansion valve.

9. The combined heat pump/air conditioning system of claim 1, wherein said sub-cool transfer means includes integral heat exchangers of said accumulator and said suction line.

10. A combined heat pump/air conditioning system having multiple heating and cooling modes of operation comprising in combination:

a reversible heat pump means including a compressor, an evaporator means and heat exchange means interconnected and charged with refrigerant fluid to produce heating and/or cooling upon demand;

said heat exchange means effecting heat transfer between the refrigerant fluid and a first working fluid to condense said refrigerant fluid;

an accumulator and suction line for feeding refrigerant fluid to said compressor;

reversing valve means for switching said system between said heating/cooling modes;

pressure reducing means for feeding said refrigerant fluid to said evaporator during said cooling only mode of said second working fluid;

bypass means for directing said refrigerant fluid around said pressure reducing means; and control means for activating said bypass means in the multiple heating modes for said heat exchange means, whereby increased efficiency for said working fluids for both cooling and heating effect is obtained in the respective heating/cooling modes of operation.

11. The combined heat pump/air conditioning system of claim 10, wherein said heat exchange means of said heat pump means comprises tank means forming a condenser and feed line therefor, and said first working fluid is water for providing a hot water supply.

12. The combined heat pump/air conditioning system of claim 11, wherein said evaporator means of said heat pump means includes an outdoor coil and feed line therefor for evaporating said refrigerant fluid by contact with ambient air during a first heating mode of said first working fluid.

13. The combined heat pump/air conditioning system of claim 12, wherein is further provided sub-cool transfer means for refrigerant fluid for reclaim of heat from said heat exchange means and provided by the refrigerant fluid in at least one of said accumulator and suction line prior to entry into said compressor, said sub-cool transfer means further including sub-cool coil means in said evaporator means to release additional heat to the ambient air during the multiple heating modes; and additional bypass means for said refrigerant fluid from said heat exchange means with respect to said sub-cool transfer means when said reversing valve means is set for the cooling only mode of a second working fluid;

said control means also operating to activate said additional bypass means for bypassing said sub-cool transfer means and delivering refrigerant fluid to said pressure reducing means for said cooling only mode.

14. The combined heat pump/air conditioning system of claim 11, wherein said evaporator means of said heat pump means includes an indoor coil and feed line therefor for evaporating said refrigerant fluid for space cooling of air as the second working fluid during a combined heating/cooling mode for heating of said first working fluid/cooling of said second working fluid, and also for evaporating said refrigerant fluid during the cooling only mode.

15. The combined heat pump/air conditioning system of claim 11, wherein said tank means includes a pair of tanks connected in series to the water supply;

a condenser feed line for hot refrigerant gas from said compressor and including a pair of heat transfer sections;

one of said heat transfer sections being in each tank;

said condenser feed line extending in a counterflow relationship to the water supply.

16. The combined heat pump/air conditioning system of claim 10, wherein said bypass means includes a flow line around said pressure reducing means and a flow valve for opening and closing said flow line.

17. The combined heat pump/air conditioning system of claim 16, wherein said pressure reducing means is an expansion valve, and wherein is provided temperature sensing means downstream of said evaporator means for regulating the flow through said expansion valve.

18. The combined heat pump/air conditioning system of claim 17, wherein said control means includes a microprocessor, and space temperature sensing means and hot water temperature sensing means on said tank means providing input to said microprocessor for control of said flow valve in the flow line bypassing said expansion valve, said flow valve being a solenoid valve for open/close operation.

19. A combined heat pump/air conditioning system having multiple heating and cooling modes of operation comprising in combination:

a reversible heat pump means including a compressor, an evaporator means and heat exchange means interconnected and charged with refrigerant fluid to produce heating and/or cooling upon demand;

said heat exchange means effecting heat transfer between the refrigerant fluid and a first working fluid to condense said refrigerant fluid;

an accumulator and suction line for feeding refrigerant fluid to said compressor;

sub-cool transfer means for refrigerant fluid for reclaim of heat from said heat exchange means and provided by the refrigerant fluid in at least one of said accumulator and suction line prior to entry into said compressor;

reversing valve means for switching said system between said heating/cooling modes;

bypass means for said refrigerant fluid from said heat exchange means with respect to at least a portion of said sub-cool transfer means when said reversing valve means is set for the cooling mode of a second working fluid;

means for feeding said bypassed refrigerant fluid to said evaporator during said cooling mode of said second working fluid; and control means for activating said first bypass means for bypassing said sub-cool transfer means and delivering refrigerant fluid to said evaporator for said cooling mode, and for deactivating said first bypass means in the multiple heating modes for said heat exchange means, whereby increased efficiency for said working fluids for both cooling and heating effect is obtained in the respective heating/cooling modes of operation.

20. The combined heat pump/air conditioning system of claim 19, wherein said heat exchange means of said heat pump means comprises tank means forming a condenser and feed line therefor, and said first working fluid is water for providing a hot water supply.

* * * * *